(12) United States Patent
Chen et al.

(10) Patent No.: US 8,114,184 B2
(45) Date of Patent: Feb. 14, 2012

(54) HONEYCOMB CERAMIC PARTICULATE FILTRATION SUBSTRATE, A PARTICULATE FILTER AND A FILTRATION SYSTEM AS WELL AS PRODUCTION METHODS THEREOF

(75) Inventors: Qinghua Chen, Yunnan (CN); Dianyi Li, Yunnan (CN); Yi Li, Yunnan (CN)

(73) Assignee: Yunnan Filter Environment Protection S.&T. Co., Ltd., Kunming (CN)

( * ) Notice: Subject to any disclaimer, the term of this patent is extended or adjusted under 35 U.S.C. 154(b) by 260 days.

(21) Appl. No.: 12/063,813

(22) PCT Filed: Aug. 17, 2006

(86) PCT No.: PCT/CN2006/002092
§ 371 (c)(1),
(2), (4) Date: Feb. 14, 2008

(87) PCT Pub. No.: WO2007/019801
PCT Pub. Date: Feb. 22, 2007

(65) Prior Publication Data
US 2008/0236123 A1 Oct. 2, 2008

(30) Foreign Application Priority Data
Aug. 17, 2005 (CN) .......................... 2005 1 0010967

(51) Int. Cl.
*B01D 46/00* (2006.01)
(52) U.S. Cl. ......................... 55/523; 264/628; 264/630
(58) Field of Classification Search ............ 55/522–524; 422/168–172, 178–182
See application file for complete search history.

(56) References Cited

U.S. PATENT DOCUMENTS
3,905,775 A * 9/1975 Sowards et al. ............... 422/180
(Continued)

FOREIGN PATENT DOCUMENTS
CN 1123259 5/1996
(Continued)

OTHER PUBLICATIONS
Translation of Abstract for each Foreign Patent Document cited above (attached and referred to as Document 1), May 30, 2008.

*Primary Examiner* — Duane Smith
*Assistant Examiner* — Amber Orlando
(74) *Attorney, Agent, or Firm* — Workman Nydegger

(57) ABSTRACT

A honeycomb ceramic filtration substrate, a filter made of the said substrate and a filter system made of the said filter and their production methods are published in the present invention. The said substrates are extruded with a paste comprising (by portion): SiC: 1; Clay: 0.05-0.5; Flour: 0.1-0.35; grease: 0.025-0.05; Water: 0.2-0.35. The said sintered substrate has a honeycomb structure with cells density ranging from 4~62 cells/cm$^2$; The cell wall thickness is: 0.2-1.2 mm; The porosity of the cell wall: 40-70%. The cell wall through pore rate is more than 30%; The average diameter distribution of the cell wall micro-pores is in the ranging of 1-50 μm. The said substrate can be designed in different cylinders whose cross section are in form of square, one border curved square and one border curved triangle etc., After adhering the substrates, the filter can be used as vehicle particulates filter. After the canning of the filter, the filter system is produced. The problem of particulates pollutant from the vehicles can be resolved via the present invention, and it is especially efficient to treat the diesel exhaust particulates which are harmful to the human health.

8 Claims, 2 Drawing Sheets

U.S. PATENT DOCUMENTS

| | | | |
|---|---|---|---|
| 4,777,152 A * | 10/1988 | Tsukada | 501/80 |
| 5,952,079 A * | 9/1999 | Andou et al. | 428/116 |
| 6,582,796 B1 | 6/2003 | Joulin et al. | |
| 6,669,751 B1 | 12/2003 | Ohno et al. | |
| 6,815,038 B2 * | 11/2004 | Morimoto et al. | 428/116 |
| 6,942,713 B2 * | 9/2005 | Ogunwumi et al. | 55/523 |
| 7,052,532 B1 * | 5/2006 | Liu et al. | 96/154 |
| 7,122,237 B2 * | 10/2006 | Hamanaka et al. | 428/131 |
| 7,179,316 B2 * | 2/2007 | Merkel et al. | 55/523 |
| 2002/0180117 A1 * | 12/2002 | Yamamoto et al. | 264/630 |
| 2003/0091479 A1 * | 5/2003 | Kircanski | 422/179 |
| 2003/0093982 A1 * | 5/2003 | Suwabe et al. | 55/523 |
| 2003/0108458 A1 * | 6/2003 | Ichikawa et al. | 422/180 |
| 2004/0112024 A1 * | 6/2004 | Noguchi et al. | 55/523 |
| 2004/0177600 A1 * | 9/2004 | Ichikawa et al. | 55/523 |
| 2005/0011174 A1 * | 1/2005 | Hong et al. | 55/523 |
| 2005/0016140 A1 * | 1/2005 | Komori et al. | 55/523 |
| 2005/0077226 A1 * | 4/2005 | Bishop et al. | 210/321.6 |
| 2005/0091952 A1 * | 5/2005 | Ogunwumi et al. | 55/523 |
| 2005/0106083 A1 * | 5/2005 | Hirai et al. | 422/180 |
| 2005/0175514 A1 * | 8/2005 | Ohno | 422/177 |
| 2005/0266992 A1 * | 12/2005 | Ohno et al. | 502/439 |

FOREIGN PATENT DOCUMENTS

| | | |
|---|---|---|
| CN | 1358161 | 7/2002 |
| CN | 1548402 | 11/2004 |
| JP | 8332329 | 12/1996 |
| WO | WO03093657 | * 11/2003 |

* cited by examiner

HONEYCOMB CERAMIC PARTICULATE FILTRATION SUBSTRATE, A PARTICULATE FILTER AND A FILTRATION SYSTEM AS WELL AS PRODUCTION METHODS THEREOF

TECHNICAL FIELDS

The present invention relates to a kind of honeycomb ceramic filtration substrate, a filter composed of the said substrate and a filtration system made of the said filter as well as production methods thereof. More specifically, the present invention relates to a kind of wall flow filtration substrate made of SiC (silicon carbides) based material, a filter made of the said substrate, a filtration system and their production methods. The filtration system can be used in the fields of the vehicle exhaust treatment (especial for diesel vehicle) or the industrial pollution air treatment.

BACKGROUND ART

The quantity of the vehicle is increasing rapidly in the recent years. This results in the additional air pollution due to exhaust gases. The vehicle emission accounts for 50-60% of air pollutant in some area crowded with vehicles, especially in the cities and metropolitans. Nowadays, people take great importance to the survival environment, and air pollution treatment has become a sensible topic. In order to decrease the vehicle emission, three measures will be adopted: Treatment before the motor, in the motor and after the motor (after-treatment). With the increasing stringent emission standard, the after-treatment becomes more and more important. The after-treatment device for vehicle (especially for the diesel vehicle) is made of three parts: the envelope, the particulates filter and the catalyst. The characteristics of the catalyst and filter determine the quality of the after-treatment device and play a vital role to the after-treatment.

Studying carefully the prior art nowadays, such as which disclosed by a Japanese company NGK, French company IBIDEN, they have used the pure SiC material to produce the particulates filter (see EP 1142619A1). The extrusion process has been applied to produce the product. Because of the specificity of the production of SiC particulates filtration substrate, the adhesion was used to combine the substrate together forming a particulates filter. The world well known way is used to plug the cell alternately to get the wall flow structure. The particulates filter can be used in the filtration and the regeneration of particulates matters. The refractory temperature of the pure SiC material is very high which can be up to 2200° C., so it has great advantage in standing for the high temperature during the course of filtration and regeneration of particulates matters.

Nevertheless, the temperature of sintering is very high which has described in the EP1142619A1 Article [0065] that "The sintering temperature is set to 2100° C. to 2300° C. in the present embodiment to obtain the average pore diameter of 6 μm-15 μm and a porosity of 35% to 50%. Further, the sintering time is set to 0.1 hours to 5 hours. Further, the interior of a furnace has an inert atmosphere during sintering, and the pressure in that atmosphere is the normal pressure". Because the sintering temperature is much higher than 2000° C., this kind of production needs the high quality sintering equipments and instruments as well as huge investment. Furthermore, the sintering procedure is under an inert atmosphere. The production art is very sophisticated and consumes great amount of energy. The consequence is the high cost of product. This is the main drawback for the application especial for the developing countries. Higher quality/price ratio of the product is the key problem to be solved in the technical field in order that the product can be applied in the automobile industry world wide.

DESCRIPTION OF THE INVENTION

In view of the drawback of the existing technologies, one object of the present invention is to apply SiC as main ceramic material and clay as the adhesive material to produce a kind of honeycomb ceramic filtration substrate which can be used to produce the particulates filter and in turn to produce a filtration system. A further object of the present invention is to provide the production methods of the honeycomb particulates filtration substrate, the particulates filter and the particulates filtration system which will be disclosed in the present invention.

The present invention can be achieved with the following technical steps:

The present invention provides a kind of honeycomb ceramic particulates filtration substrate, the green ceramic substrate is extruded with a paste composed of as following materials (in portion): Silicon carbides (SiC): 1; Clay: 0.05~0.5; Flour: 0.1~0.35; Grease: 0.025~0.05; Water: 0.2~0.35. The green ceramic substrate will under sinter process, and the sintered substrate has honeycomb structure with cell density ranging from 4~62 cells/$cm^2$, the thickness of the cell walls which separate the cells is 0.2~1.2 mm, the porosity of the cell walls is of 40%~70%; The cell walls through pore rate>30%; the average diameter distribution of the cell wall micro-pores is in the range of 1~50 μm.

The said clay is selected from industrial clay such as the calcined kaolin, or pigment clay, the said grease is selected from one of the heavy distillated lubrication oil or compound lubrication oil, or their compounds.

The said silicon carbides are preferably selected from two kinds of silicon carbides with grain sizes differences are between 200~400 meshes, and their weight ratio is from 1:4 to 3:4.

The present invention provides a kind of production method of the honeycomb ceramic particulates filtration substrate. The steps are as follows:

(1) Weigh the ingredient materials according to their portion;

(2) Mix the SiC and the clay together, and then to add the grease to mix them in the mixer homogeneously, waiting to be used for next step;

(3) Mix the flour with the water under the ambient temperature into milky liquid state, and to heat them to the temperature of 65° C.~100° C. until it becomes a viscous flour paste;

(4) Mix the mixture of step (2) and the viscous flour paste together, the mixing step lasts 1~3 hours;

(5) Mix and sieve the mixture of step (4) so that it can be homogeneous.

(6) Extrude the mixture with a die to form a honeycomb substrate. The cross section of the honeycomb substrate has different geometry shapes and has cells density ranging from 4~62 cells/$cm^2$. To dry it under the ambient temperature and then plug the cells alternately on each end face of the honeycomb substrate to form the green ceramic wall flow particulates filtration substrate.

(7) With the sintering speed of <5° C./min to the temperature of 600° C.~900° C., lasting for 2~12 hours, and then to raise the temperature to 1250° C.~1350° C. and to last for 0.5~12 hours, and then cool down naturally to the ambient temperature to get the sintered honeycomb ceramic particulates filtration substrate.

Preferably, in step (2), the silicon carbides are selected by the vibration sieve, to take two kinds of silicon carbides whose grain sizes difference are from 200 meshes to 400 meshes, and their weight ratios are 1:4~3:4.

The experimental investigation of the present invention shows that:

(1) The sintered honeycomb ceramic particulates filtration substrate has a porosity of 40%-70%, among which, the through pore rate is more than 30%, the average diameters of the micro-pores of the cell wall are 1~50 µm. If the diameter of the micro-pores is higher than 50 µm, the particles will leak out through the pores, so the particles can't be kept in the cells and this will reduce the filtration effect; so the optimal average micro-pores diameters are 10~30 µm.

(2) The thickness of the cell wall of the sintered honeycomb ceramic particulates filtration substrate is from 0.2 to 1.2 mm, if the thickness is superior to 1.2 mm, then the through pore rate will be lower, and the back pressure will be higher, this will also affect the motor power; if the thickness of the wall is less than 0.2 mm, then the mechanical resistance will be lower. The optimal thickness of the cell wall is from 0.2~0.6 mm.

(3) The match of the silicon carbides grain sizes is very important to the porosity. Generally, two or more than two sizes of the silicon carbides are to be chosen, and it is better that the difference of the sizes is 200~400 meshes. For example, "200 meshes+400" meshes is a good match to get a satisfied result. The above example is just one case and there are several types of matches. The content of the silicon carbides is from 50% to 95%.

(4) It is preferably to choose the industrial clay or the pigment clay, and the grain size of the clay chosen for the high temperature adhesive phase should be superior to 200 meshes. The quantity of the clay should be chosen according to the grain size of the silicon carbides. It would be better to choose the quantity which is a little bit higher than the percolation limit, the proportion of the clay is generally 5%~50%.

The present invention further provides a kind of wall flow particulates filter. The particulates filter is composed of said several honeycomb ceramic particulates filtration substrates, the substrates are connected by an adhesive agent, the said adhesive agent is composed of the ingredients, whose weight portions are: silicon carbides: 1, clay: 0.2~1, water glass: 0.06~0.35. The thickness of the adhesive agent layer is about 1~3 mm.

The present invention further provides the production method of the wall flow particulates filter, it includes the following steps:

(1) Make use of the said honeycomb ceramic particulates filtration substrate to be as the component parts;
(2) Put the adhesive agent on the side faces of the substrates. The adhesive agent is composed as the following weight portion: silicon carbides: 1; clay: 0.2~1; water glass: 0.06~0.35; the thickness of the adhesive agent is about 1~3 mm; and then to stick the parts together to form the different geometry shapes and then to get the semi-finished particulates filter;
(3) Brush the side surface of the semi-finished particulates filter with the adhesive agent. After the drying treatment, the particulates filter is obtained.

The application volume of the particulates filter should match the motor cylinder volume of the vehicle. The experimental tests of the present invention show that the best match is that the volume of the particulates filter is 1 to 2.5 times of the volume of the diesel motor cylinder volume.

The regeneration of the particulates filter can be realized by using the proper physical and chemical methods, for example the CRT (continuous regeneration technology), or burning with the oil spray or electrical heating methods. These devices would be better to be used with the car or diesel OBD (on board diagnostic) system.

The present invention further provides a kind of particulates filtration system including a stainless steel envelope, a filter welt in the stainless steel envelope, a thermal isolate layer, inlet and outlet of the gases. The characteristic of the system is that the filter is the said particulates filter of the present invention.

The present invention yet further provides a production method of a kind of particulates filtration system. The method including: Pack the said particulates filter with the thermal isolate layer, welt and canned in the stainless steel envelope, welding the enveloped filter with the inlet of gas and outlet of gas together to produce the exhaust gases particulates filtration system. This kind of particulates filtration system can be applied in the fields of the filtration of the diesel exhaust particulates and after-treatment.

The principle of the present invention is as follows: By using the percolation theory in the physico-chemical principles, a kind of refractory material SiC is used as the principal ingredient; it can be more easily sintered under a temperature relatively much lower than the other technologies but the product can still keep a certain refractory. By losing a certain degree of refractory, it enables not only be satisfied with the catalysis and filtration functions but also enables easily meet the purpose to reduce the consumption of the energy and lower the costs, hence to enlarge easily the production scale as well as enter into the markets. The basic requirement is the volume or weight proportion of the clay should close to or a little bit more than the percolation limit. In the normal tri-dimension material, this ratio must be 5%~50%, and this percentage is not only decided by the type of material, but also decided by the microstructure of material, so there is a certain lower limit for each material. The present invention also makes use of an advanced extrusion method to produce the green honeycomb ceramic substrate. By taking the advantage of the traditional sintering technology and by adjusting the ingredient, the product can arrive to the ideal refractory, thermal conductivity, thermal expansion, porosity and mechanical resistance etc.

Comparing with the prior art, the present invention has the beneficial results:

(1) The invention products have the following key characteristics: ① By using the advanced extrusion technique, the honeycomb ceramic substrate has more and homogeneous pores, the cell density of substrate can be varied from 4~62 cells/cm$^2$. ② By using the percolation principle and selection of grain size, there are many micro-pores on the cell wall (the size of the pore and its distribution can be adjusted by the grain size of the SiC powder and adhesive paste as well as the pore-forming powder or paste), this is the benefit not only for the loading of catalysis but also for the filtration of the diesel exhaust particulates. ③ The filtration and regeneration of the diesel particulates can be achieved by using some chemical way or burning with the oil spray or electrical heating process to burn away the particulates to ensure the diesel particulates filter can be cyclically and efficiently used.

(2) Since the industrial grade of silicon carbides and clay are used as raw material, there are enough resources with economical price. It is easy to form the shape and the sintering process can make full use of the traditional refractory sintering equipment. The production procedure can be operated easily. The sintered ceramic substrate not only has expected pores but also has good thermal conductivity, porosity and mechanical resistance to be used as the catalyst substrate and filtration substrate in the fields of vehicle and chemical industries etc.

(3) Comparing with the invention disclosed application by IBIDEN, the sintering temperature of the product should be raised to 2100° C.~2300° C. This kind of production needs high quality of the sintering equipment and instrument as well as the important investment. Further more, the sintering procedure is under an inert atmosphere, so the production art is sophisticated and it consumes a great deal of energy. This results in high production cost. But the sintering temperature of the present invention is relative lower around 1350° C. without the inert atmosphere to protect the sintering process, so the costs can be lowered down greatly. It obviously economizes the precious energy and reduces the equipment and machine investment. In consequence, the advantageous ratio of the characteristics and price can be achieved. And at the same time, by using the world well known technology to plug the cells of the each end face alternately, the wall flow particulates filter is produced. In conclusion, the present invention whose raw materials are easy to get, the cost is lower down obviously, the technical art is easy to operate, the sintering procedure is reasonable.

(4) The present invention has wide range of applications. For example, it can be used as a filter in the melting slag filtration or exchanger for metallurgical industry. It can also be used for the polluted water filtration in environment protection. It can still be used as the catalyst substrate for chemical industry. It also can be used for the production of aviation and space related materials. The present invention relates the honeycomb ceramic particulates filtration substrate based on silicon carbides can be firstly applying in the vehicle exhaust treatment and can be used especially in the diesel exhaust reduction, all the exhausts which have great pollution to the environment.

REFERENCE NUMERALS

Figure 1:
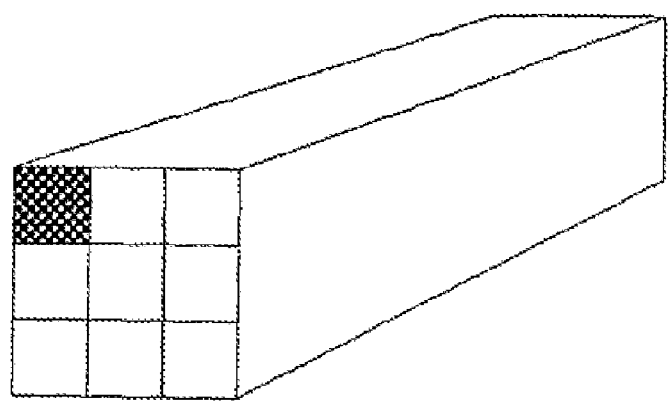
FIG. 1 is a schematic view of honeycomb ceramic particulates filter of the present invention with square cross section

1: Thermal isolate layer; 2: Particulates filter; 3: Stainless steel envelope; 4: Exhaust gases inlet; 5: Exhaust gases outlet.

BEST MODE FOR CARRYING OUT THE INVENTION

Hereinafter, the present invention will be described more specifically with reference to the following Examples. The following Examples are for illustrative purpose and are not intended to limit the scope of the invention.

EXAMPLE 1

The ingredients of the materials are silicon carbides, selected clay, flour, grease and water. Their weight portions are: silicon carbides: 1; selected clay: 0.5; flour: 0.35; grease: 0.05 and water: 0.35. The grain sizes of the silicon carbides powders are 200 meshes and 400 meshes with the weight ratio of 1:3; the grain size of the clay is 1200 meshes.

To put the flour and water together and mix them into milky liquid state and heating the milky liquid to the temperature around 65° C. to 100° C. to transform it into the viscous flour paste and then wait to be used;

To put the silicon carbides, clay and grease together and mix them in the mixer for one hour, and then add the above prepared flour paste to mix them together for one hour to form the mixture into compound pastes, wait to be used. And then filter out the compound pastes from a sieve of 100 meshes.

To extrude the filtered pastes through a die to get the green honeycomb ceramic substrate with the dimensions of 57×57× 254/mm$^3$, the cell wall thickness is 1.2 mm, and the cell density is 25 cells/inch$^2$ (25 CPSI).

After drying and plugging the pore alternatively, the green ceramic substrate will be sintered with the sintering speed of <5° C./min to the temperature of 600° C., lasting for 6 to 12 hours, and then raise the temperature to 1250° C., lasting for 6 to 12 hours and then cool down naturally to the ambient temperature to get the honeycomb ceramic particulates filtration substrate. The characteristics of the sintered substrate are listed in table 1.

TABLE 1

| The sample size: 57 × 57 × 254 mm$^3$ model: MJK-1 | |
| --- | --- |
| Composition of the product | Sintered [(α-SiC) + (β-SiC) +Clay] |
| Real material density (g/cm$^3$) | 3.60 |
| Cell wall density (g/cm$^3$) | 1.40 |
| Apparent density of substrate (g/cm$^3$) | 0.70 |
| Cells per square inch/thickness of cell wall in milli-inch (CPSI/Mil) | 25/47 |
| Back pressure (mbar) | <70~200 |
| Distribution of the pores μm | 1~50 |
| Through pore ratio | >30% |
| Refractory temperature (° C.) | 1500 |
| Normal use temperature (° C.) | −20~1400 |

EXAMPLE 2

Repeat the procedure of example 1. The differences are as follows:

The weight portions of materials are: silicon carbides: 1; selected clay: 0.15; flour: 0.35; distillated lubrication oil (one kind of grease): 0.05; and water: 0.35. The grain sizes of the silicon carbides powder are 200 meshes and 500 meshes with the weight ratio of 3:4; the grain size of the clay is 1000 meshes.

EXAMPLE 3

Repeat the procedure of example 1. The differences are as follows:

The weight portions of materials are: silicon carbides: 1; selected clay: 0.3; flour: 0.18; distillated lubrication oil (one kind of grease): 0.03 and water: 0.25. The grain sizes of the silicon carbides powders are 200 meshes and 600 meshes with the weight ratio of 1:4; the grain size of the clay is 200 meshes.

EXAMPLE 4

Repeat the procedure of example 1. There are the differences as follows:

The weight portions of materials are: silicon carbides: 1; selected clay: 0.4; flour: 0.3; compound lubrication oil (one kind of grease): 0.04 and water: 0.30. The grain sizes of the silicon carbides powders are 250 meshes and 450 meshes with the weight ratio of 1:3; the grain size of the clay is 800 meshes.

EXAMPLE 5

The ingredients of the materials are silicon carbides, selected clay, flour, compound lubrication oil and water. Their weight portions are: silicon carbides: 1; selected clay: 0.2; flour: 0.35; compound lubrication oil (one kind of grease): 0.05 and water: 0.35. The grain sizes of the silicon carbides powders are 200 meshes and 400 meshes with the weight ratio of 1:3; the grain size of the clay is 1200 meshes.

To put the flour and water together and mix them into milky liquid state and heating the milky liquid to the temperature around 65° C. to 100° C. to transform it into the viscous flour paste and then wait to be used;

To put the silicon carbides, clay and grease together and mix them in the mixer for two hours, and then add the above prepared flour paste to mix them together for two hours to form the mixture into compound pastes, wait to be used.

And then filter out the compound pastes from a sieve of 120 meshes. To extrude the filtered pastes through a die to get the green honeycomb ceramic substrate with the dimensions of 36×36×254/mm³, the cell wall thickness is 1.0 mm, and cell density is 25 cells/inch² (25 CPSI).

After drying and plugging the pore alternatively, the green ceramic substrate will be sintered with the sintering speed of <1° C./min to the temperature of 900° C., lasting for 2 to 6 hours, and then raise the temperature to 1350° C., lasting for 0.5 to 2 hours and then cool down naturally to the ambient temperature to get the honeycomb ceramic particulates filtration substrate. The characteristics of the sintered substrate are listed in table 2.

TABLE 2

The sample size: 36 × 36 × 254 mm³, model: MJK-2

| Composition of the product | Sintered [(α-SiC) + (β-SiC) +Clay] |
|---|---|
| Real material density (g/cm³) | 3.62 |
| Cell wall density (g/cm³) | 1.41 |
| Apparent density of substrate (g/cm³) | 0.74 |
| Cells per square inch/thickness of cell wall in milli-inch (CPSI/Mil) | 25/47 |
| Back pressure (mbar) | <70~200 |
| Distribution of the pores μm | 1~50 |
| Through pore ratio | >30% |
| Refractory temperature (° C.) | 1500 |
| Normal use temperature (° C.) | −20~1400 |

EXAMPLE 6

The ingredients of the materials are silicon carbides, selected clay, flour, compound lubrication oil and water. Their weight portions are: silicon carbides: 1; selected clay: 0.1; flour: 0.35; compound lubrication oil and distillated lubrication oil (two kinds of grease): 0.05 and water: 0.35. The grain sizes of the silicon carbides powders are 220 meshes and 440 meshes with the weight ratio of 1:3; the grain size of the clay is 1200 meshes.

To put the flour and water together and mix them into milky liquid state and heating the milky liquid to the temperature around 65° C. to 100° C. to transform it into the viscous flour paste and then wait to be used;

To put the silicon carbides, clay and grease together and mix them in the mixer for one hour, and then add the above prepared flour paste to mix them together for one to three hours to form the mixture into compound pastes, wait to be used.

And then filter the compound pastes with a sieve of 150 meshes. To extrude the filtered pastes through a die to get the green honeycomb ceramic substrate with the dimensions of 36×36×254/mm³, the cell wall thickness is 0.6 mm, and cell density is 120 cells/inch² (120 CPSI).

After drying and plugging the pore alternatively, the green ceramic substrate will be sintered with the sintering speed of <3° C./min to the temperature of 800° C., lasting for 4 to 6 hours, and then raise the temperature to 1300° C., lasting for 1 to 4 hours and then cool down naturally to the ambient temperature to get the honeycomb ceramic particulates filtration substrate. The characteristics of the sintered substrate are in listed table 3

TABLE 3

The sample size: 36 × 36 × 254 mm³ model: MJK-3

| Composition of the product | Sintered [(α-SiC) + (β-SiC) +Clay] |
|---|---|
| Real material density (g/cm³) | 3.65 |
| Cell wall density (g/cm³) | 1.48 |
| Apparent density of substrate (g/cm³) | 0.78 |
| Cells per square inch/thickness of cell wall in milli-inch (CPSI/Mil) | 120/24 |
| Back pressure (mbar) | <70~200 |
| Distribution of the pores μm | 1~50 |
| Through pore ratio | >30% |
| Refractory temperature (° C.) | 1500 |
| Normal use temperature (° C.) | −20~1400 |

EXAMPLE 7

Figure 2:
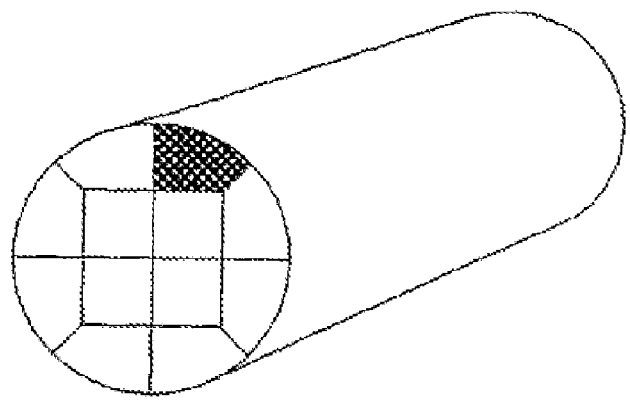
FIG. 2 is a schematic view of honeycomb ceramic particulates filter of the present invention with round cross section
Figure 3:
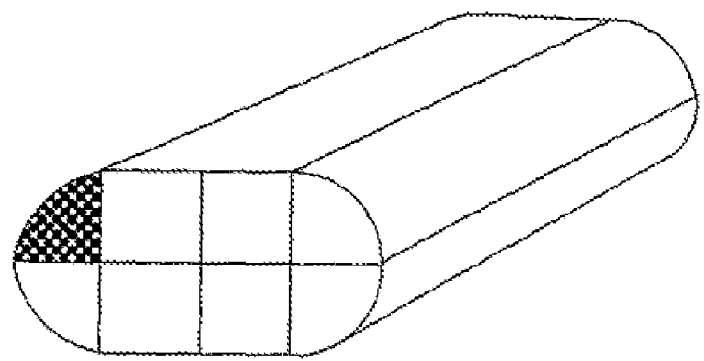
FIG. 3 is a schematic view of the honeycomb ceramic particulates filter of the present invention with elliptic cross section

As illustrated in the FIG. 1 to 3:

(1) Take the any kind of the particulates filtration substrate according to the examples 1 to 6 to be a component parts;
(2) Put the adhesive agent on the side faces of the substrates. The adhesive agent is composed as the following weight portion: silicon carbides: 1; clay: 0.2; water glass: 0.06; the thickness of the adhesive agent is about 1 mm; and then to adhere the parts together to form the different geometry shapes such as parallelepiped with a square section, parallelepiped with rectangle section, round or elliptic cylinder to get the semi-finished particulates filter;
(3) Brush the side surface of the semi-finished filter with the adhesive agent. After the drying treatment, the particulates filter is obtained.

EXAMPLE 8

(1) Take the any kind of the particulates filtration substrate according to any of the examples 1 to 6 to be a component parts;
(2) Put the adhesive agent on the side faces of the substrates. The adhesive agent is composed as the following weight portion: silicon carbides: 1; clay: 1; water glass: 0.35; the thickness of the adhesive agent is about 3 mm; and then to adhere the parts together to form the different geometry shapes such as parallelepiped with a square section, parallelepiped with rectangle section, round or elliptic cylinder to get the semi-finished particulates filter;

(3) To brush the side surface of the semi-finished filter with the adhesive agent. After the drying treatment, the particulates filter is obtained.

EXAMPLE 9

Figure 4:
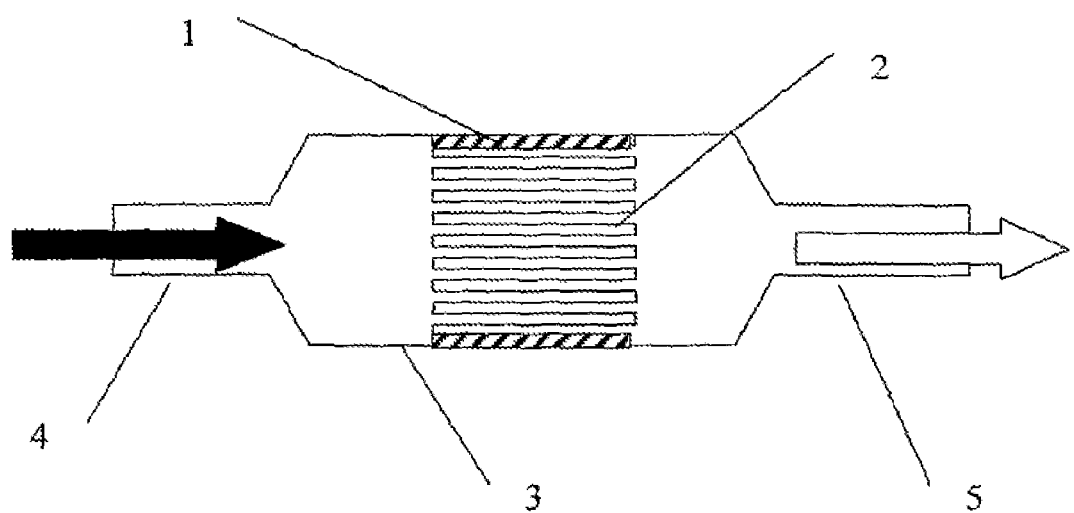
FIG. 4 is a schematic view of the particulates filtration system used in the diesel particulates filtration and after-treatment.

As illustrated in the FIG. 4, pack the particulates filter 2 in example 7 and example 8 with the thermal isolate layer 1, welt and canned in a stainless steel envelope 3, welding the enveloped filter with the inlet of gas 4 and outlet of gas 5 together to produce the exhaust gases particulates filtration system. This kind of particulates filtration system can be applied in the fields of the filtration of the diesel exhaust particulates in the after-treatment.

The invention claimed is:

1. A honeycomb ceramic particulates filtration substrate formed by extruding and sintering a paste, the paste comprising:
    a unit weight portion of silicon carbides (SiC);
    a weight portion ranging from about 0.05 to about 0.5 of clay;
    a weight portion ranging from about 0.1 to about 0.35 of flour;
    a weight portion ranging from about 0.025 to about 0.05 of grease; and
    a weight portion ranging from about 0.2 to about 0.35 of water,
    wherein the sintered substrate formed by extruding and sintering the paste has:
        a honeycomb structure with a cell density ranging from about 4 to about 62 cells/cm$^2$,
        a cell wall thickness ranging from about 0.2 to about 1.2 mm,
        a cell wall porosity ranging from about 40% to about 70%,
        a cell wall through pore rate of more than 30%, and
        an average diameter distribution of cell wall micro-pores ranging from about 1 to about 50 μm, and
    wherein the silicon carbides are selected from two grain sizes such that each of the silicon carbides of a first one of the two grain sizes differs in size from each of the silicon carbides of a second one of the two grain sizes by an amount ranging from about 200 to about 400 meshes, and a ratio of difference in weight between the two grain sizes of silicon carbides ranges from about 1:4 to about 3:4.

2. The honeycomb ceramic particulates filtration substrate according to claim 1, wherein the clay includes only industrial and/or pigment clay.

3. A method of producing the honeycomb ceramic particulates filtration substrate according to claim 1, the method comprising:
    (1) weighing the SiC, clay, flour, grease and water according to their respective weight portions;
    (2) mixing the SiC and the clay together, and then mixing the grease into the mixture of SiC and clay to form a homogeneous mixture;
    (3) mixing the flour with the water at an ambient temperature into a milky state liquid, and heating the milky state liquid to a temperature ranging from about 65° C. to about 100° C. until the milky state liquid becomes a viscous flour paste;
    (4) mixing the mixture of step (2) and the viscous flour paste together for about 1 to about 3 hours;
    (5) sieving the mixture of step (4) to form a homogeneous ceramic paste;
    (6) extruding the ceramic paste with a die to form a honeycomb substrate, the cross section of the honeycomb substrate having one of a variety of different geometric shapes and having a cell density ranging from about 4 to about 62 cells/cm$^2$, drying the honeycomb substrate at the ambient temperature, and then plugging the cells alternately on each end face of the honeycomb substrate; and
    (7) sintering the honeycomb substrate by raising the temperature to a temperature ranging from about 600° C. to about 900° C. at a speed of less than 5° C./min and, after about 2 to about 12 hours, raising the temperature again to a temperature ranging from about 1250° C. to about 1350° C. and, after about 0.5 to about 12 hours, naturally cooling the temperature down to the ambient temperature to produce the honeycomb ceramic particulates filtration substrate.

4. A particulates filter, wherein said filter is made of multiples ones of the particulates filtration substrate according to any of claims 1, and 2, the multiple substrates being adhered with an adhesive agent, said adhesive agent comprising: a unit weight portion of silicon carbides; a weight portion ranging from about 0.2 to about 1 of clay; a weight portion ranging from about 0.06 to about 0.35 of water glass, the adhesive agent being applied with a thickness of about 1 to about 3 mm.

5. A method of producing the particulates filter according to claim 4, the method comprising:
    (1) putting the adhesive agent on side faces of each of the multiple substrates, and then adhering the multiple substrates together such that each of the multiple substrates forms a filter component part of a semi-finished particulates filter;
    (2) brushing a side surface of the semi-finished particulates filter with the adhesive agent and allowing the adhesive agent to dry.

6. The method of producing the particulates filter according to claim 5, wherein a shape of a cross section of a first one of the multiple substrates in the particulates filter differs from a shape of a cross section of a second one of the multiple substrates in the particulates filter.

7. The method of producing the particulates filter according to claim 5, wherein the multiple substrates are arranged to form the particulates filter in a cylindrical shape having one of a circular and an elliptical cross section.

8. The method of producing the particulates filter according to claim 5, wherein each substrate in the particulates filter has the same cross sectional shape.

* * * * *